No. 847,690. PATENTED MAR. 19, 1907.
C. B. POST.
WALL FASTENING FOR STOVEPIPES.
APPLICATION FILED AUG. 8, 1904.
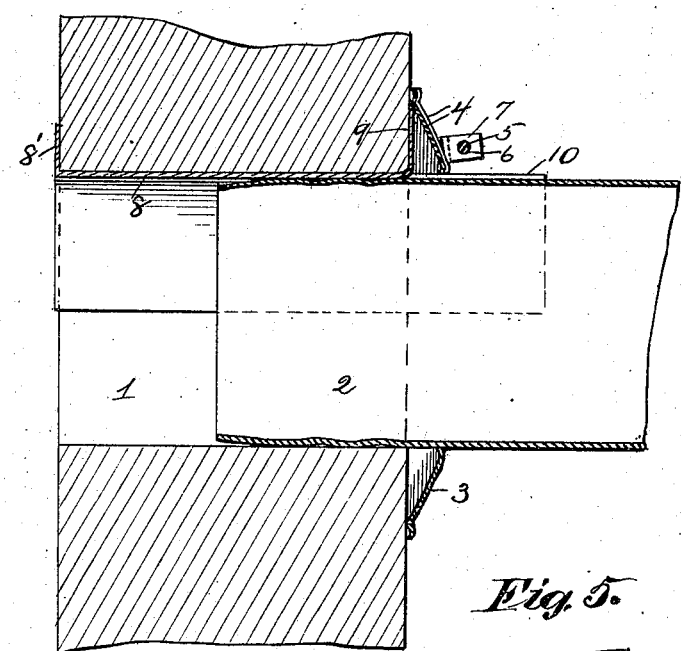
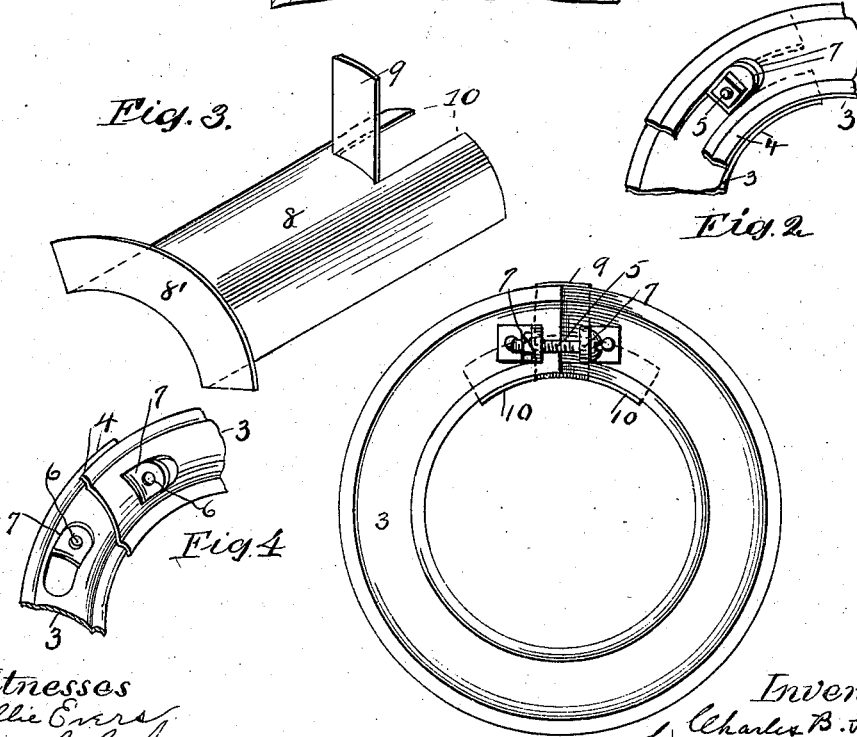

UNITED STATES PATENT OFFICE.

CHARLES B. POST, OF NEW LONDON, OHIO.

WALL-FASTENING FOR STOVEPIPES.

No. 847,690.　　　Specification of Letters Patent.　　Patented March 19, 1907.

Application filed August 8, 1904. Serial No. 219,827.

*To all whom it may concern:*

Be it known that I, CHARLES B. POST, a citizen of the United States, and a resident of New London, county of Huron, State of Ohio, have invented certain new and useful Improvements in Wall-Fastenings for Stovepipes, of which I hereby declare the following to be a full, clear, and exact description, such as will enable others skilled in the art to which it appertains to make and use the same.

The objects of the invention are to provide means for securely attaching the extremity of a stovepipe to the chimney and to so attach the pipe that it can neither creep into or out of the chimney-opening; and it consists in a split collar of frusto-conical section, the ends of which overlap, and in means for drawing the ends past each other upon the pipe and upon a locking plate or keeper, whereby the collar is made to assume a frusto-conical form of greater length of axis, and the locking device is brought into tighter engagement with the inner wall of the chimney and stovepipe.

In the accompanying drawings, Figure 1 is a vertical central section through chimney-wall and stovepipe, showing the collar in operative position, the stovepipe, and the keeper or retaining device. Fig. 2 is a face view or plan view of collar, showing outer edge of keeper and adjusting-screw. Fig. 3 is a perspective view of the keeper. Fig. 4 shows the overlapping extremities of the collar provided with integral lugs cut from the substance of the collar. Fig. 5 is a similar view showing the extremities of the collar adapted to inclose the lugs.

In these views, 1 is the chimney-opening. 2 is the stovepipe.

3 is the collar, which is split on one side and the ends permitted to overlap, as at 4, so as to completely close the opening between the stovepipe and chimney-hole against falling soot and make a neat finish to the joint. The collar is pressed into the usual shape for the sake of appearances and is broad enough to cover the opening between the stovepipe and chimney-hole and prevent the escape of soot should the opening be larger than the pipe. The ends of the collar are brought together to tightly engage the pipe by means of a bolt or screw 5 passing through holes 6 in the lugs 7, which in Figs. 1 and 2 are shown to be riveted to the collar and in Fig. 4 are shown to be formed out of integral portions of the collar when the collar is formed of heavy sheet metal.

Between the collar and the stovepipe is placed the keeper 8, which is a curved sheet-metal plate provided with a curved rigid flange 8' on its inner edge, and also with a flexible tongue 9 on its outer end formed by cutting two slits in the outer end of the plate. This plate is laterally curved to conform to the shape of the stovepipe and opening and to give it greater rigidity. The plate 8 is first inserted in the stovepipe-hole, and the flange 8' is placed behind the chimney-wall. The tongue 9 is then bent at right angles to the plate so as to engage the outer face of the wall, leaving the outer ends of the plate projecting at 10. The stovepipe is then thrust as far as desired into the chimney-hole, and the collar is clamped upon both the outer ends 10 of the plate 8 and the pipe, thus securing all tightly together. The plate 8 is broad enough to form a curved shell, so as to obtain extreme rigidity of the inner flange. The tongue 9 being narrow is flexible and can be bent back against the chimney, thus locking the part 8 rigidly in the stovepipe-hole. The projecting ends 10 of the plate are also narrow and flexible and when the collar is clamped thereon the collar, stovepipe, and projecting ends 10 are tightly secured together and immovable.

The split collar is substantially the frustum of a cone, being of less diameter at one end than at the other. The effect of contracting the ring is then to increase the height of the frustum, and hence to force the broad edge more firmly against the chimney-wall, so as to draw the inside flange of the plate 8 more firmly against the inside surface of the chimney and bind the parts to the chimney as well as to compress the plate and pipe together. A rigid combination of the pipe, curved plate, and split collar with the chimney is thereby afforded, so as to prevent the device from coming out and also prevent side swaying in the opening for the smoke-pipe. Thus a clamping device of greater efficiency and more elastic tension upon the chimney is produced than could be obtained with a flat clamping-band.

Having described my invention, what I claim as new, and desire to secure by Letters Patent, is—

1. The combination with a chimney having a stovepipe-opening, a stovepipe inserted therein, and a clamping-plate adapted to engage the inner face of the chimney-wall and extend outward over the stovepipe beyond said wall, of a split collar of frusto-conical form having overlapping ends and sleeved over said pipe and projecting end of the said clamping-plate, and means for contracting said collar whereby by the action of the collar as set forth the length of the axis of the frustum is increased and the parts are locked together.

2. The combination in a stovepipe-fastener with the chimney and chimney-hole of a pipe, inserted in the chimney-hole, a curved plate having an inner flange adapted to engage the inner surface of the chimney, means upon the plate for adjustably engaging the outer surface of the chimney, a projecting portion of the plate lying upon the pipe, a split and frusto-conical collar about the pipe having overlapping ends, and means for reducing the diameter of the collar whereby by the action of the collar as set forth the parts are locked in position and its length of axis is increased, substantially as described.

3. The combination with a chimney-wall having an opening, a stovepipe therein and a locking-plate engaging the inner side of the chimney-wall, of a split collar of frusto-conical form, having overlapping ends and means for drawing the ends past each other to reduce the diameter and increase the height of the frustum, the said collar being sleeved over the pipe and outer end of said plate.

In testimony whereof I hereunto set my hand this 27th day of June, 1904.

CHARLES B. POST.

Witnesses:
WM. M. MONROE,
GEO. S. COLE.